(12) United States Patent
Fey

(10) Patent No.: US 12,220,871 B2
(45) Date of Patent: Feb. 11, 2025

(54) METHOD FOR ADDITIVE MANUFACTURE, AND SYSTEM

(71) Applicant: AMCM GMBH, Starnberg (DE)

(72) Inventor: Georg Fey, Munich (DE)

(73) Assignee: AMCM GMBH, Starnberg (DE)

( * ) Notice: Subject to any disclaimer, the term of this patent is extended or adjusted under 35 U.S.C. 154(b) by 239 days.

(21) Appl. No.: 17/309,334

(22) PCT Filed: Nov. 7, 2019

(86) PCT No.: PCT/EP2019/080568
§ 371 (c)(1),
(2) Date: May 19, 2021

(87) PCT Pub. No.: WO2020/104205
PCT Pub. Date: May 28, 2020

(65) Prior Publication Data
US 2022/0032552 A1  Feb. 3, 2022

(30) Foreign Application Priority Data

Nov. 19, 2018 (DE) ..................... 10 2018 129 024.1

(51) Int. Cl.
| | | |
|---|---|---|
| *B29C 64/393* | (2017.01) | |
| *B29C 64/153* | (2017.01) | |
| *B29C 64/214* | (2017.01) | |
| *B29C 64/282* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/393* (2017.08); *B29C 64/153* (2017.08); *B29C 64/214* (2017.08); *B29C 64/282* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,172,562 B2 | 5/2012 | Mattes | |
| 9,358,729 B2 | 6/2016 | Hofacker et al. | |

(Continued)

FOREIGN PATENT DOCUMENTS

| | | |
|---|---|---|
| CN | 1678448 A | 10/2005 |
| CN | 105479743 A | 4/2016 |

(Continued)

OTHER PUBLICATIONS

"German Application No. 10 2018 129 024.1, Search Report dated Jul. 12, 2019", (Jul. 12, 2019), 8 pgs.

(Continued)

*Primary Examiner* — Yung-Sheng M Tsui
(74) *Attorney, Agent, or Firm* — Polsinelli PC

(57) ABSTRACT

A method for the additive manufacture of at least one three-dimensional object by means of a system, wherein a coating unit is moved onward through any number of segments and/or subsegments such that the coating unit performs at least one idle run. A system for the additive manufacture of three-dimensional objects, and a computer-readable storage medium are also disclosed.

7 Claims, 3 Drawing Sheets

(56) References Cited

U.S. PATENT DOCUMENTS

Figure 1A:
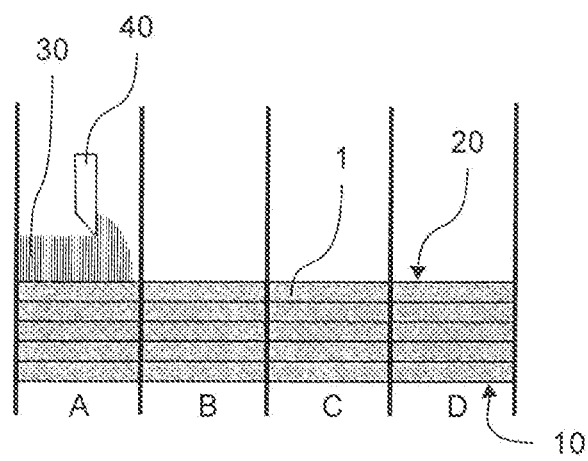

| | | | |
|---|---|---|---|
| 9,573,225 | B2 | 2/2017 | Buller et al. |
| 9,662,840 | B1 | 5/2017 | Buller et al. |
| 9,694,541 | B2 | 7/2017 | Pruett et al. |
| 9,919,360 | B2 | 3/2018 | Buller et al. |
| 9,962,767 | B2 | 5/2018 | Buller et al. |
| 10,144,176 | B1 | 12/2018 | Buller et al. |
| 10,252,336 | B2 | 4/2019 | Buller et al. |
| 10,272,525 | B1 | 4/2019 | Buller et al. |
| 10,315,252 | B2 | 6/2019 | Symeonidis et al. |
| 10,449,696 | B2 | 10/2019 | Elgar et al. |
| 10,611,092 | B2 | 4/2020 | Buller et al. |
| 10,722,944 | B2 | 7/2020 | Wienberg |
| 10,786,865 | B2 | 9/2020 | Hellestam |
| 10,946,446 | B2 | 3/2021 | Domrose et al. |
| 11,247,390 | B2 | 2/2022 | Krol et al. |
| 11,613,073 | B2 | 3/2023 | Barnes |
| 11,848,534 | B2 | 12/2023 | Batchelder et al. |
| 2012/0211155 | A1 | 8/2012 | Wehning et al. |
| 2013/0193620 | A1 | 8/2013 | Mironets |
| 2015/0367415 | A1 | 12/2015 | Buller et al. |
| 2016/0167160 | A1 | 6/2016 | Hellestam |
| 2016/0167303 | A1 | 6/2016 | Petelet |
| 2016/0368050 | A1* | 12/2016 | Morris .................. B29C 64/245 |
| 2017/0072636 | A1 | 3/2017 | Ng et al. |
| 2017/0259505 | A1 | 9/2017 | Pruett et al. |
| 2017/0305140 | A1 | 10/2017 | Wüst |
| 2017/0348905 | A1 | 12/2017 | Fey |
| 2018/0281113 | A1 | 10/2018 | Carter et al. |
| 2018/0281282 | A1 | 10/2018 | Elgar et al. |
| 2018/0281283 | A1 | 10/2018 | Frechman et al. |
| 2018/0281284 | A1 | 10/2018 | Elgar et al. |
| 2018/0311734 | A1 | 11/2018 | Herzog et al. |
| 2019/0168304 | A1 | 6/2019 | Krol et al. |
| 2019/0232564 | A1 | 8/2019 | Pontiller-Schymura et al. |
| 2019/0315064 | A1* | 10/2019 | Budge ..................... B22F 10/28 |
| 2019/0344500 | A1 | 11/2019 | Cote |
| 2020/0094320 | A1 | 3/2020 | Krol et al. |
| 2022/0001614 | A1 | 1/2022 | Fey |
| 2022/0016839 | A1 | 1/2022 | Fey |

FOREIGN PATENT DOCUMENTS

| | | | |
|---|---|---|---|
| CN | 106363768 | A | 2/2017 |
| CN | 106608044 | A | 5/2017 |
| CN | 107457988 | A | 12/2017 |
| CN | 107980022 | A | 5/2018 |
| DE | 10235434 | A1 | 2/2004 |
| DE | 102009046440 | A1 | 5/2011 |
| DE | 102010041284 | A1 | 3/2012 |
| EP | 3233336 | A1 | 10/2017 |
| EP | 3281727 | A1 | 2/2018 |
| EP | 3360659 | A1 | 8/2018 |
| WO | WO-2008074287 | A1 | 6/2008 |
| WO | WO-2014199150 | A1 | 12/2014 |
| WO | WO-2017100816 | A1 | 6/2017 |
| WO | WO-2020104205 | A1 | 5/2020 |

OTHER PUBLICATIONS

"International Application No. PCT/EP2019/080568, International Search Report and Written Opinion mailed Feb. 17, 2020", (Feb. 17, 2020), 19 pgs.

"U.S. Appl. No. 17/309,302, Preliminary Amendment filed May 17, 2021", 8 pgs.

"U.S. Appl. No. 17/309,303, Preliminary Amendment filed May 17, 2021", 8 pgs.

"German Application Serial No. 102018129024.1, Search Report dated Jul. 12, 2019", (w/ Concise Statement of Relevance), 9 pgs.

"International Application Serial No. PCT/EP2019/080568, International Preliminary Report on Patentability mailed Jun. 3, 2021", 9 pgs.

"International Application Serial No. PCT/EP2019/080597, International Preliminary Report on Patentability mailed Jun. 3, 2021", 9 pgs.

"International Application Serial No. PCT/EP2019/080597, International Search Report mailed Feb. 17, 2020", (w/ English Translation), 6 pgs.

"International Application Serial No. PCT/EP2019/080597, Written Opinion mailed Feb. 17, 2020", (w/ English Translation), 14 pgs.

"International Application Serial No. PCT/EP2019/080610, International Preliminary Report on Patentability mailed Jun. 203, 21", 9 pgs.

"International Application Serial No. PCT/EP2019/080610, International Search Report mailed Feb. 17, 2020", (w/ English Translation), 6 pgs.

"International Application Serial No. PCT/EP2019/080610, Written Opinion mailed Feb. 17, 2020", (w/ English Translation), 13 pgs.

"Chinese Application No. 201980085828.2, Notification of the First Office Action mailed Dec. 2, 2022", (Dec. 2, 2022), 18 pgs.

"U.S. Appl. No. 17/309,303, Restriction Requirement mailed Jun. 27, 2023", 7 pgs.

"Chinese Application No. 201980086717.3, Notification of the First Office Action mailed Jan. 4, 2023", (Jan. 4, 2023), 17 pgs.

"Chinese Application No. 201980087068.9, Chinese Search Report dated Dec. 14, 2022", (Dec. 14, 2022), 3 pgs.

"Chinese Application No. 201980087068.9, Office Action dated Dec. 21, 2022", (Dec. 21, 2022), 14 pgs.

"U.S. Appl. No. 17/309,302, Response filed Oct. 2, 2023 to Restriction Requirement mailed Aug. 4, 2023", 11 pgs.

"U.S. Appl. No. 17/309,302, Restriction Requirement mailed Aug. 4, 2023", 7 pgs.

"U.S. Appl. No. 17/309,303, Non Final Office Action mailed Aug. 30, 2023", 22 pgs.

"U.S. Appl. No. 17/309,303, Response filed Aug. 22, 2023 to Restriction Requirement mailed Jun. 27, 2023", 9 pgs.

"U.S. Appl. No. 17/309,302, Non Final Office Action mailed Dec. 27, 2023", 16 pgs.

"U.S. Appl. No. 17/309,302, Response filed Mar. 27, 2024 to Non Final Office Action mailed Dec. 27, 2023", 10 pgs.

"U.S. Appl. No. 17/309,303, Response filed Dec. 28, 2023 to Non Final Office Action mailed Aug. 30, 2023", 17 pgs.

"U.S. Appl. No. 17/309,303, Final Office Action mailed May 9, 2024", 24 pgs.

* cited by examiner

METHOD FOR ADDITIVE MANUFACTURE, AND SYSTEM

PRIORITY CLAIM TO RELATED APPLICATIONS

This application is a U.S. national stage filing under 35 U.S.C. § 371 from International Application No. PCT/EP2019/080568, filed on 7 Nov. 2019, and published as WO2020/104205 on 28 May 2020, which claims the benefit under 35 U.S.C. 119 to German Application No. 10 2018 129 024.1, filed on 19 Nov. 2018, the benefit of priority of each of which is claimed herein, and which applications and publication are hereby incorporated herein by reference in their entirety.

DESCRIPTION

The invention relates to a method for additive manufacturing of three-dimensional objects and a system for additive manufacturing of three-dimensional objects. Furthermore, the present invention relates to a computer-readable storage medium.

Conventional methods for additive manufacturing of three-dimensional objects apply a strictly serial sequence of applying a new layer of build-up material and irradiating it to solidify the applied layer. Such a serial approach results in very large non-productive times, which reduce the overall efficiency of the system. Accordingly, the production of even a single three-dimensional object by means of an additive manufacturing method is cost-intensive and time-consuming.

Furthermore, known systems for the additive manufacturing of three-dimensional objects require additional space in order to be able to accommodate or stow the coating unit outside the area to be selectively solidified, i.e. outside the build space, during the irradiation for the selective solidification of the last applied build-up material.

For example, document DE 10 2010 041 284 A1 describes a method and an equipment for selective laser sintering, wherein the work piece to be produced in layers comprises at least partially a curved contour and is produced by means of a plurality of linear energy inputs by laser beams. In particular, a continuous lowering of the work piece and a continuous rotation of the powder distributor are provided.

The invention is based on the object of indicating a method for additive manufacturing which enables the efficient production or generation of at least one three-dimensional object with consistent quality in a simple and cost-effective manner. Furthermore, the object of the invention is to indicate a system and a computer-readable storage medium.

According to the invention, this object is solved by the subject matter with respect to the method, by the subject matter with respect to the system and by the subject matter with respect to the computer-readable storage medium.

Specifically, the object is solved by a method for the additive manufacturing of three-dimensional objects by means of a system which comprises a build space, a build platform within the build space, on which the at least one object to be produced can be built up layer by layer, at least one coating unit for applying the build-up material layer by layer in a building plane which is provided parallel to the build platform, and at least a first irradiation unit and a second irradiation unit for locally selective solidification of the build-up material in the building plane, the method comprising the following steps:

subdividing the build space into at least a first and a second segment along an extension direction of the build platform, wherein at least one of the segments is formed as a single segment or is subdivided into at least two subsegments and each segment or the subsegments of one of the segments is assigned to one of the irradiation units;

moving the coating unit in the build space along the segments, in particular at a constant speed;

applying at least one layer of the build-up material by means of the moving coating unit;

activating the assigned irradiation unit in the respective segment or subsegment once the at least one layer of build-up material is completely applied in the respective segment or subsegment, the applied layer of build-up material is not yet selectively solidified and the coating unit has left the segment or subsegment;

deactivating the application of build-up material by the coating unit after the application of at least one layer of the build-up material, wherein the coating unit is moved on through any number of segments and/or subsegments so that the coating unit performs at least one idle run.

The invention is based on the basic idea of providing a method that uses the coating unit and the irradiation units in such a way that optimum utilisation is achieved by minimising non-productive times. In particular, the process time for manufacturing one or more three-dimensional objects can be optimised or reduced, respectively.

For this purpose, it is provided that the coating unit is moved both during the application of a layer of build-up material along the direction of extension of the build-up platform and during the subsequent phase of selective solidification. To that effect, the coating unit is preferably moved continuously. In particular, the coating unit is moved exclusively along the extension direction of the build platform so that additional build space for an associated system for at least temporarily accommodating the coating unit can be saved.

For the purpose of an additive manufacturing process, it is possible to build up or create a three-dimensional object or a plurality of three-dimensional objects layer by layer. Thus, it is intended to generate the geometry of the at least one three-dimensional object by incrementally depositing and solidifying, in particular by locally selective solidifying, layers of the build-up material on top of each other.

For the purposes of the present invention, the term of selective solidification means that a layer of newly applied build-up material is appropriately solidified along the desired contour or contours of the at least one three-dimensional object to be produced. For this purpose, the applied layer of build-up material is specifically irradiated by the irradiation units along the geometry of the three-dimensional object to be produced. A layer of build-up material is selectively solidified in the sense of the present invention once a sufficient, appropriate solidification of the layer of build-up material has taken place or has been achieved, respectively. A selectively solidified layer of build-up material thus represents a part of the end product to be produced and preferably the basis for depositing and selectively solidifying a further layer of build-up material.

According to the invention, the build space, i.e. the volume of a system for carrying out the method in the direction of extension or along the build platform, in which the at least one or more three-dimensional objects can be built up in layers, is subdivided into at least a first and a second segment. The layers of build-up material to be applied or deposited, respectively, are to be assigned in sections to the first or second segment. The build plane set in each case can be subdivided on the basis of the segments.

Preferably, the build platform is provided as a circular or ring-shaped, oval-shaped, U-shaped, rectangular frame-shaped or similar build platform so that one three-dimensional object or more three-dimensional objects can be produced and arranged over an angular range of 360 degrees along a circumferentially or circularly closed build platform. In this respect, a circulation of the coating unit can be understood to mean that the coating unit is moved over at least 360 degrees along the extension of the build platform. The extension of the build platform is thus to be understood in particular as the formation of the build platform in the circumferential direction along the angular range of 360 degrees.

Furthermore, the segments can be provided as single segments or each have subsegments. In this way, a segment can be subdivided into subsegments or is dividable into subsegments.

One of the at least two irradiation units is assigned to one of the segments. Irradiation of subsegments of a segment by one of the irradiation units for selective solidification can be carried out serially, i.e. one after the other.

Alternatively, subsegments can be alternately selectively solidified by means of the assigned irradiation unit of the segment in such a way that the coating unit can move through the subsegments and, before the expiry of the irradiation time as required in one of the subsegments, the irradiation unit switches to selective solidification of the other subsegment.

As a result, an irradiation unit can switch between two subsegments as required during the selective solidification, in particular before the irradiation time as required of one of the subsegments has expired. If a switch between the subsegments is made by the assigned irradiation unit and the irradiation time as required in one subsegment has not been completely reached, the selective solidification of this subsegment is to be continued at a later time in order to reach selective solidification.

There is the advantage that by means of the subsegments a passage of the coating unit through a segment is made possible, while the selective solidification can be continued alternately in one of the subsegments at a time.

A deactivation of an irradiation unit is to be understood in the sense of the present invention as a turning off of the irradiation unit or as a switching of the irradiation unit between subsegments for selective solidification, wherein the irradiation unit is switched from one subsegment to the other subsegment. In such a switch of the irradiation unit from one subsegment to another subsegment, a complete switching off of the irradiation unit in the sense of the present invention is not necessarily required, so that the irradiation unit selectively solidifies build-up material along the subsegments without interruption.

Furthermore, it is provided that the coating unit can preferably be moved continuously, in particular at constant speed, in the extension direction of the build platform or build plane during the manufacturing method of at least one three-dimensional object. In this regard, the coating unit can be moved continuously and preferably without interruption, regardless of whether a new layer of build-up material is applied along the set build plane. Preferably, the speed at which the coating unit is moved is adjusted in such a way that an advantageous minimisation of non-productive times during the production or manufacture, respectively, of the at least one three-dimensional object can be achieved.

In particular, the coating unit is moved at least at a minimum speed, the minimum speed for moving the coating unit corresponding to a minimum speed for depositing or applying, respectively, a layer of build-up material.

Preferably, the coating unit can be moved at a maximum speed, where the maximum speed for moving the coating unit corresponds to a maximum speed for depositing or applying, respectively, a layer of build-up material. In this way, the time required for a circulation of the coating unit along the extension of the build platform or build plane can be minimised.

An idle run of the coating unit with at least the minimum speed to be maintained is performed if a circulation time of the coating unit for applying the at least one layer of build-up material would end before the irradiation time as required in at least one of the segments along the set build plane has not yet been reached or expired, respectively. Accordingly, an idle run is performed if the coating unit during applying a new layer of build-up material would enter a segment that has not yet been completely selectively solidified.

In this regard, the application of a layer of build-up material is only carried out in a contiguous, complete circulation along the build plane. If this is not possible due to segments or subsegments which are not yet selectively solidified, an idle run is carried out by the coating unit.

According to the invention, the selective solidification of the build-up material in a segment takes place when at least one layer of build-up material is deposited along the entire segment or an entire subsegment by activating the respective assigned irradiation unit.

If a segment or subsegment is only coated in sections with build-up material, preferably no selective solidification is performed until the coating unit has deposited a complete layer of build-up material. The activation of the respectively assigned irradiation unit can exclusively take place if the coating unit is not located in the respective segment or subsegment which is to be selectively solidified. Furthermore, the respective irradiation unit for a segment or subsegment of a segment is only activated if the last applied layer of build-up material has not already been selectively solidified.

Accordingly, deactivation of the irradiation unit in the sense of the present invention takes place when a segment or the associated subsegments is/are selectively solidified or when the coating unit enters the segment and/or subsegment to be selectively solidified.

It is further provided according to the present invention that the application of build-up material by the coating unit is deactivated after the application of at least one layer of build-up material, wherein the coating unit continues to move on along any number of segments and/or subsegments without applying or depositing or dispensing a new layer of build-up material, such that the coating unit performs at least one idle run.

In particular, the application of build-up material by means of the coating unit can be deactivated as soon as at least one complete layer of build-up material has been deposited in all segments and/or subsegments.

A complete layer is understood to mean that build-up material is deposited over the entire extension of a segment or subsegment. To that effect, the coating unit accomplishes at least one complete circulation along the build platform in order to deposit a layer of build-up material. If a segment or subsegment has only been newly coated in part, the subsequent deposition of a further layer over the entire extension of the segment or subsegment is planned to provide a complete layer of build-up material, in particular following the other segments in the course of the last accomplished circulation of the coating unit.

In particular, the coating unit is moved in the extension direction of the build platform during the entire process duration, whereby a discharge as required of a new layer of build-up material is performed. In this sense, the coating unit performs interruption-free circulations along the extension of the build platform.

After deactivating the discharge of build-up material, the further movement of the coating unit along the extension of the build platform can be understood as an idle run. An idle run can comprise one or more segments or subsegments or can comprise one or more circulations or partial circulations of the coating unit. During such an idle run, no new layer of build-up material is dispensed, whereby the irradiation units of the segments are deactivated in each case once the coating unit enters the respective segment or an associated subsegment.

According to the invention, after the application of at least one layer of build-up material, the coating unit may perform any number of circulations or partial circulations to perform idle runs until a new layer of build-up material is or can be expediently applied.

By means of the preferably continuously moving coating unit, including the execution of idle runs, and the purposefully tuned irradiation for selectively solidifying at least one applied layer of build-up material, an efficient and time-saving method for the additive manufacturing of at least one three-dimensional object can be provided, in particular when the coating unit is moved on at a maximum speed or maximum velocity.

According to an embodiment, the respective irradiation unit for a segment or a subsegment of a segment is deactivated while the coating unit is passing through the respective segment or subsegment or once an irradiation time as required for selectively solidifying the deposited layer of build-up material in a segment or subsegment is reached.

By subdividing the segments into subsegments, the selective solidification can be carried out alternately in the subsegments by means of the assigned irradiation unit while the coating unit passes through the segment.

The irradiation unit can perform selective solidification in the subsegments preferably alternately in such a way that the selective solidification is not interrupted. The irradiation unit in the activated state can change between subsegments. A deactivation of the irradiation unit in this sense is to be understood as temporarily suspending or interrupting the selective solidification in one of the subsegments, while the other subsegment is selectively solidified to allow the coating unit to pass.

The irradiation units for selective solidification of the segments and/or subsegments are purposefully activated and deactivated to provide an efficient and process time reducing manufacture for at least one three-dimensional object.

For the purposes of the invention, the process time describes in particular the period of time for the complete production or manufacture of one or more three-dimensional objects distributedly arranged along the build platform.

For the purposes of the present invention, an irradiation time as required is to be understood as the period of time required for selective solidification of the last applied layer of build-up material in a segment or subsegment. It is thus conceivable that the irradiation time as required for different segments or subsegments differ from one another.

According to a further embodiment, a change in relative position between the build platform and the coating unit to provide an altered build plane is carried out continuously or discontinuously.

For the purposes of the present invention, the speed of the coating unit or coating unit speed describes in particular the speed at which the coating unit moves along the extension of the build platform, in particular in the horizontal direction. The speed of the relative movement between the build platform and the coating unit describes the speed in the course of the change of the relative position between the build platform and the coating unit, in particular in the vertical direction.

The movement of the coating unit in the direction of extension of the build platform is preferably provided in a continuous form. Furthermore, the relative movement, preferably at least substantially in the vertical direction, between the coating unit and the build platform can also be continuous.

Thus, an ongoing or continuous, i.e. interruption-free, readjustment of the build plane can be carried out by means of the relative movement between the build platform and the coating unit to change the relative position. Thus, the relative movement or readjustment of the build plane can be continued during the application of a layer of build-up material as well as during an idle run of the coating unit.

Alternatively, a discontinuous change of the relative position between the build platform and the coating unit, i.e. stepwise readjustment of the build plane, is possible. Furthermore, it is also possible in the sense of the present invention that the coating unit is temporarily stopped for changing the relative position between the build platform and the coating unit, in particular during an idle run. A discontinuous movement of the coating unit is possible.

In an embodiment, the coating unit begins depositing another layer of build-up material in any selectively solidified segment or subsegment as a lowering segment when the coating unit can accomplish a circulation to apply a layer of build-up material without entering a not selectively solidified segment or subsegment.

The deposition of a new layer of build-up material by the coating unit preferably only starts when the build plane has already been readjusted, i.e. a new build plane has been set.

According to the invention, the lowering segment is understood to be the segment or subsegment in which the coating unit starts depositing a layer of build-up material along the newly adjusted or readjusted build plane after the change of or during the change of the relative position between the coating unit and the build platform. In the lowering segment, an incomplete layer of build-up material is thus initially deposited over a section of the segment or subsegment.

In particular, the deposition of a new layer of build-up material along the readjusted build plane can be started by the coating unit when the selective solidification of the previously deposited layer of build-up material is sufficiently advanced and completed by the time the coating unit enters the respective segment or subsegment. In this regard, the new layer of build-up material is applied exclusively to build-up material that has already been selectively solidified.

In the sense of the invention, the terms "when" or "once" are preferably not to be understood as a concrete point of time, but rather as a determination of a condition to be fulfilled by means of which the execution of, for example, the application of a new layer of build-up material, can be determined.

After the layer of build-up material has been applied, the selective solidification is started or carried out by means of the assigned irradiation unit in a segment and/or subsegment following the lowering segment.

According to an embodiment, the coating unit deposits a complete layer of build-up material in the lowering segment following the other segments or subsegments.

Due to the deposition of an incomplete layer of build-up material along the lowering segment, after the resumption or activation of the application of build-up material, no selective solidification can take place by the associated irradiation unit after the coating unit has left. A further complete layer of build-up material must be applied over the entire lowering segment by the coating unit in order to be able to initiate a selective solidification.

Selective solidification of the applied build-up material can be carried out by the irradiation units in the set build plane or a lowered or readjusted build plane, for example in the course of the continuous relative movement between build platform and coating unit. A deviation resulting from the lowering of the build plane, in particular a change in the angle of the irradiation or selective solidification, can be taken into account or disregarded.

In an embodiment, activating the assigned irradiation unit is performed with the step of activating the associated irradiation unit in the respective segment for alternatively irradiating the associated first or second subsegment after the coating unit has left the subsegment to be selectively solidified. The coating unit may pass through the first subsegment while the second subsegment is selectively solidified, or may pass the second subsegment while the first subsegment is selectively solidified.

On the basis of the subsegments, an advantageous subdivision of the segments can be made, whereby the subsegments can be solidified serially or alternately in order to minimise non-productive times during the production or manufacture of at least one three-dimensional object, as required.

In a further aspect of the invention, a system is provided which is suitable for additive manufacturing of three-dimensional objects by layer-by-layer deposition of a build-up material and locally selective solidification of the build-up material according to the method of the present invention.

The system according to the invention is formed with the build space, the build platform within the build space, on which the at least one object to be produced can be built up layer by layer, the at least one coating unit for applying the build-up material layer by layer in a build plane which is provided parallel to the build platform, and at least the first irradiation unit and the second irradiation unit for locally selective solidification of the build-up material in the build plane. The build space is subdivided in the direction of extension of the build platform into at least the first segment and the second segment, wherein at least one of the segments is formed as a single segment or at least one of the segments is subdivided into at least two subsegments. Each segment or the subsegments of a segment is assigned to at least one of the irradiation units, wherein, after the application of at least one layer of the build-up material, the application of build-up material by the coating unit can be deactivated and the coating unit can be moved further along the build plane through any number of segments and/or subsegments so that at least one idle run can be performed with the coating unit.

The at least one coating unit serves to apply the build-up material layer by layer in a build plane which is provided parallel to the build platform. The build platform thus represents the basic plane of the system on which the at least one three-dimensional object can be produced. When depositing the first layer of build-up material for an object to be manufactured, the build plane is thus preferably arranged on the build platform.

Alternatively, the first build plane for applying the first layer of build-up material can be vertically offset relative to the build platform in such a way that a powder bed or a not selectively solidified material bed remains below the finally selectively solidified layer of build-up material. This makes it easier to detach the completed three-dimensional object from the build platform.

The coating unit can be arranged at an inclination with respect to the vertical or horizontal in such a way that an appropriate application of build-up material along the intended, adjusted build plane is possible. In particular, the coating unit can be arranged at an inclination in such a way that gravity effects can be compensated for when depositing or applying the build-up material.

For the purposes of the present invention, the build plane describes in particular the current working plane in which a new, further layer of build-up material is to be applied or selectively solidified, respectively. The readjustment of the build plane or a readjusted build plane thus describes the change of the build plane in order to be able to apply and selectively solidify a new, next layer of build-up material, in the sense of a layer-by-layer manufacture or generation of at least one three-dimensional object.

Such a readjustment of the build plane can be done by changing the relative position between the coating unit and the build platform, in particular by displacing or moving the build platform or the coating unit in the vertical direction.

According to an embodiment, the at least two segments and/or their subsegments form a closed path, in particular a circular path, along the build plane, in particular so that the coating unit can pass directly, or indirectly via at least one further segment or its subsegments, from the first segment to the second segment and from the second segment to the first segment.

The segments or subsegments are provided in such a way that a continuous, uninterrupted area is available by means of the irradiation units and the coating unit for the production or manufacture of at least one three-dimensional object. The transfer between, in particular, adjacently arranged segments or subsegments can thus take place directly.

For example, when three segments are formed, direct transfers can occur between the first and second segments, the second and third segments, and the third and first segments. An indirect transfer would be possible, for example, between the first and third segments, with the second segment in between.

As the build platform is preferably configured to be ring-shaped, a plurality of or a single three-dimensional object can be manufactured or produced circularly or over an angular range of 360 degrees, respectively, by means of the irradiation units and the coating unit.

In an embodiment, the single segments and/or their subsegments along the build platform are formed with identical size and/or have a comparable irradiation time for selective solidification of the applied layer of build-up material along the build plane so that a total irradiation time for selective solidification of at least one layer or more layers of the build-up material applied along all segments and/or subsegments in the build plane can be minimised or is minimised.

In particular, the minimisation of the respective total irradiation time for the selective solidification of one, several or all layers of the applied build-up material for the at least one three-dimensional object to be produced can be carried out along the segments or subsegments.

In particular, the segments or subsegments are distributed along the extension of the build platform in such a way that an optimal, i.e. preferably minimal, total irradiation time can be achieved for the individual layer or several layers of build-up material.

For the purposes of the present invention, the total irradiation time is to be understood as the period of time for selective solidification of the deposited layer of build-up material in all segments or subsegments. Thus, the total irradiation time starts with the start of the selective solidification in the first fully coated segment and ends with the selective solidification or the end of the selective solidification in the last selectively solidified segment of the same layer of build-up material.

Since it is possible to reduce non-productive times in addition to the total irradiation time of the plurality of layers, the process time for producing or manufacturing the at least one three-dimensional object can be reduced. At most short interruptions of the selective solidification are necessary to apply new build-up material. For example, extensive travel distances of the coating unit to areas next to the build plane or the build platform, in order to be able to park or accommodate the coating unit during the selective solidification, can be saved.

According to a further embodiment, the system is adapted to provide a relative movement for changing the vertical relative position between the build platform and the coating unit within the build space continuously or discontinuously.

The readjustment or new adjustment of the build plane can be carried out or started during the application or after the completion of the application of a previous or preceding layer of build-up material, in particular a complete layer of build-up material along all segments or subsegments. Thus, also the readjustment or new adjustment of the build plane can already be carried out when at least one of the segments or subsegments has not yet been selectively solidified.

In both the discontinuous and the continuous readjustment of the build plane by a relative movement between the build platform and the coating unit, deviations during the selective solidification of build-up material can be disregarded or can be compensated for by an adaptation of the irradiation units, in particular by a change of angle.

In the sense of a continuous movement of the coating unit, the coating unit continues to move in the direction of extension of the build platform during the readjustment of the build plane, i.e. during the vertical relative movement between the coating unit and the build platform. During the application of build-up material along a build plane, the readjustment for the following build plane can already be carried out or started. Furthermore, the relative movement or readjustment of the build plane can also be started or continued during an idle run of the coating unit.

Alternatively, the movement of the coating unit can be temporarily interrupted for the duration of the relative movement between the build platform and the coating unit, in particular in the sense of a discontinuous movement of the coating unit.

In an embodiment, the coating unit can provide for the deposition of a further layer of build-up material in any selectively solidified segment or subsegment as a lowering segment when the coating unit can complete a circulation for applying a layer of build-up material without entering a not selectively solidified segment or subsegment.

Depending on the progress of the selective solidification of the last applied layer of build-up material, a new layer of build-up material can be applied at the next possible time. In this way, an efficient production or manufacturing of at least one three-dimensional object can be provided in that the non-productive times, and, hence, the process time as a whole, can be minimised.

According to a preferred embodiment, the coating unit is movable through the first subsegment and the second subsegment in succession, wherein the first and second subsegments of the respective segment can be selectively solidified in succession or alternately by means of the associated irradiation unit. The first subsegment is passable for the coating unit while the second subsegment can be selectively solidified, or the second subsegment is passable while the first subsegment can be selectively solidified.

Thus, a segment can be utilized on the basis of the subdivision into subsegments as required or in sections, in particular so that non-productive times during the manufacture of at least one three-dimensional object can be reduced.

According to a further embodiment, the system comprises a control unit which is preferably at least adapted to control the movement and/or the duration of a circulation or a circulation period of the coating unit as well as the application of build-up material by the coating unit, an activation and deactivation of at least one of the irradiation units, preferably a plurality of irradiation units, particularly preferably all irradiation units, and/or the execution of the vertical relative movement between the build platform and the coating unit within the build space.

The control unit of the system according to the invention is preferably provided for controlling and/or regulating the system in accordance with the method according to the invention, at least on demand. In this respect, the control unit is in particular adapted to execute or carry out a method according to the invention with the system.

An efficient additive manufacturing of at least one three-dimensional object which is optimised with respect to the process time can be provided.

According to another aspect of the invention, a computer-readable storage medium is provided, which includes instructions for causing at least one processor, in particular a processor of the control unit of a system according to the invention, to implement a method according to the invention when the instructions are executed by the at least one processor.

Figure 6:
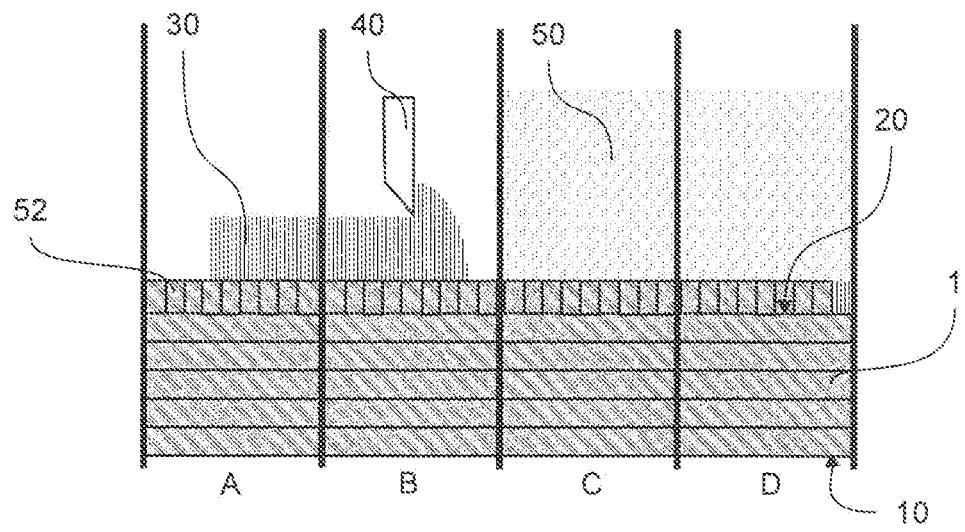
Figure 7:
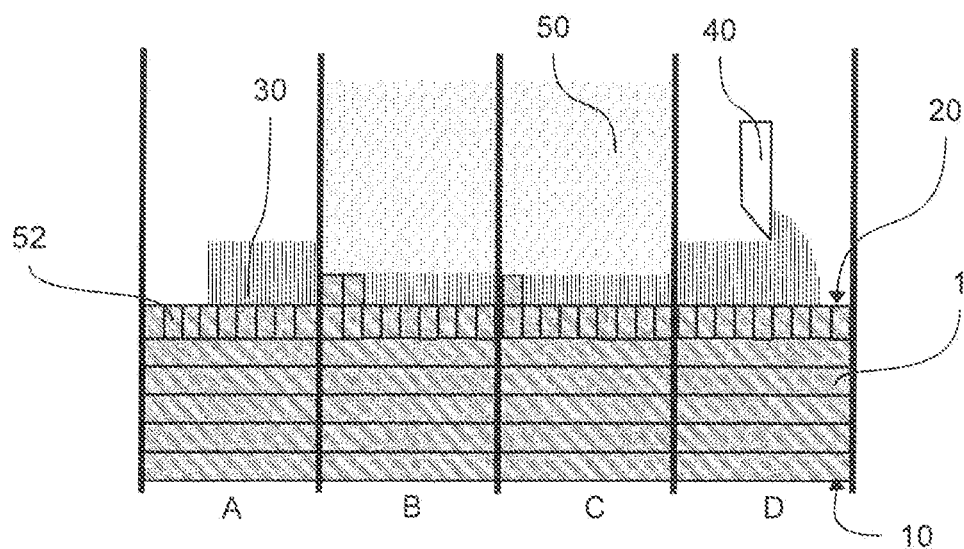
Figure 8:
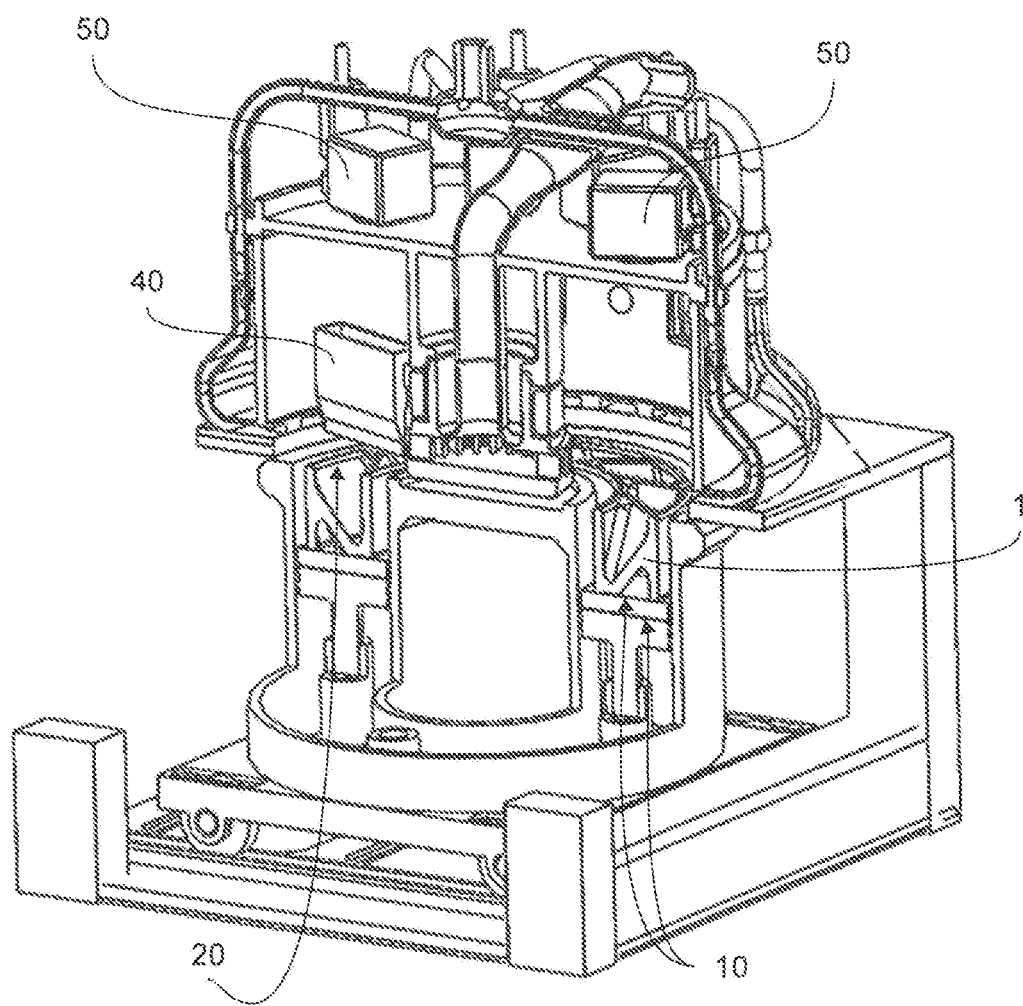

The invention is explained below in more detail with reference to the attached schematic drawings by reference to exemplary embodiments, which show in:

FIGS. 1a-7 schematic representations of various states during an exemplary sequence of the method according to the invention by means of a system according to the invention; and FIG. 8 an exemplary embodiment of a system according to the invention for additive manufacturing of at least one three-dimensional object in a perspective sectional view.

FIG. 1a shows a schematic cross-sectional view of a build platform 10, which is subdivided into a total of four segments A; B; C; D. According to FIG. 1a, five selectively solidified layers are present on the build platform for forming at least one three-dimensional object 1.

The build plane 20 provided according to FIG. 1a is set on the uppermost, selectively solidified layer of build-up material 30 of the object 1 to be manufactured. A coating unit 40 according to FIG. 1a deposits a layer of build-up material 30 along the build-up plane 20 over the extension of the first segment A.

In accordance with FIG. 1a-7, a movement of the coating unit 40 is to be understood as a movement from left to right through the segments A to D along the build platform 10. Preferably, the segments A; B; C; D have comparable, in particular identical, irradiation times as required for selective solidification of applied build-up material 30.

A preferably ring-shaped design of the build platform 10 is illustrated in FIGS. 1 to 7 by the fact that the coating unit passes directly from the fourth segment D into the first segment A in order to perform a circular movement or a circulation.

Figure 1B:
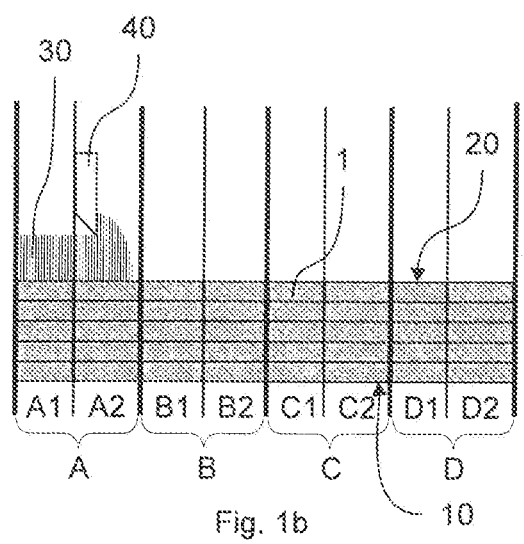

FIG. 1b shows another exemplary embodiment in which the segments A; B; C; D according to FIG. 1a are each additionally subdivided into two subsegments A1; A2; B1; B2; C1; C2; D1; D2. The coating unit 40 may apply a layer of build-up material 30 along the subsegments A1; A2; B1; B2; C1; C2; D1; D2 to deposit a complete layer of build-up material 30.

In this regard, the subsegments A1-D2 of the segments A-D may have comparable, in particular identical, irradiation times as required for selective solidification of applied build-up material 30.

Figure 2A:
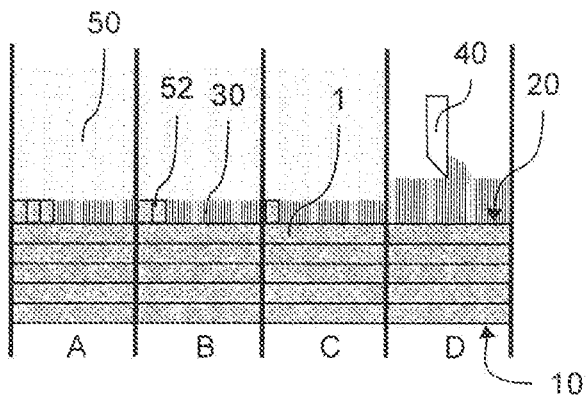

As compared to FIG. 1a, FIG. 2a shows an advanced state in the course of the depicted method. According to FIG. 2a, the coating unit 40 has applied at least one layer of build-up material 30.

Furthermore, FIG. 2a shows that the first, second and third segments A; B; C are selectively solidified by means of the respective assigned irradiation unit 50. In contrast, the fourth segment D in FIG. 2a is not selectively solidified due to the position of the coating unit 40 in the fourth segment 20 and the build-up material 30 still to be applied.

Respective progress indicators 52 along the segments A to C illustrate in FIG. 2a the progress of the selective solidification compared to the necessary irradiation time of the respective segments A; B; C. From these progress indicators 52 it is clear that selective solidification was started first in the first segment A or that selective solidification is more advanced than in the second and third segments B; C.

Figure 2B:
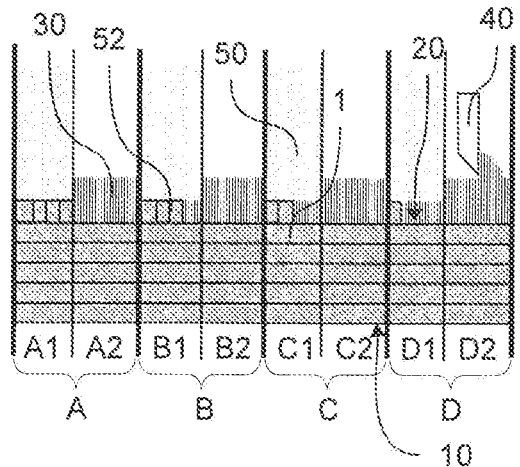

FIG. 2b illustrates the start of the selective solidification according to FIG. 2a on the basis of the subdivision of the segments A; B; C; D into two subsegments A1; A2; B1; B2; C1; C2; D1; D2 respectively according to FIG. 1b.

In particular, the subsegments A1; A2; B1; B2; C1; C2; D1; D2 of a respective segment A; B; C; D are assigned to a common irradiation unit 50 which can selectively solidify the subsegments A1; A2; B1; B2; C1; C2; D1; D2 of a segment A; B; C; D serially or alternately. Thus, in FIG. 2b it is shown that after the application of a complete layer of build-up material 30, the first subsegment A1; B1; C1; D1 of each of the segments A; B; C; D is selectively solidified.

The progress indicators 52 each indicate the progress of the selective solidification. Thus, it is shown that, according to FIG. 2b, the selective solidification of the first subsegment A1 of the first segment A is completed until the coating unit 40 enters again. Subsequently, the second subsegment A2 of the first segment A is selectively solidified by means of the associated irradiation unit 40. During the progressive selective solidification along the segments A; B; C; D or the associated subsegments A1; A2; B1; B2; C1; C2; D1; D2, the coating unit 40 will perform an idle run.

After the first subsegments A1; B1; C1; D1 are selectively solidified, the individual irradiation units 50 may each proceed to selectively solidify the second subsegment A2; B2; C2; D2.

Furthermore, it is possible that the coating units 50 of the segments A; B; C; D can alternately selectively solidify the associated subsegments A1; A2; B1; B2; C1; C2; D1; D2 during the idle run of the coating unit 50, in order to allow the coating unit 50 to pass through preferably without interrupting the selective solidification. In this way, non-productive times can be reduced.

Figure 3:
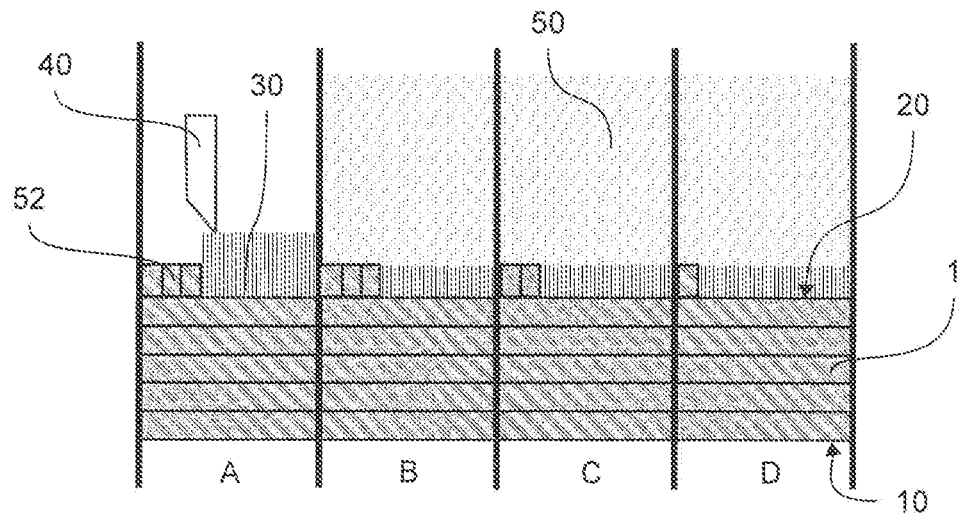

In FIG. 3, the coating unit 40 has entered the first segment A, whereupon the selective solidification by means of the assigned irradiation unit has been suspended or temporarily deactivated. Due to the up to FIG. 3 incomplete selective solidification of the first segment A according to the progress indicators 52, the selective solidification can be resumed or continued after the coating unit 40 has been moved out of the first segment A.

An already completed, temporarily suspended selective solidification of build-up material 30 in the first segment A is illustrated by a partially or sectionally reduced layer thickness, according to the progress indicators 52, and the at least temporarily deactivated irradiation unit 50.

Furthermore, according to FIG. 3, the selective solidification of the build-up material 30 in the fourth segment D has been initiated by means of the assigned irradiation unit 50.

Furthermore, it can be seen from FIG. 3 that the coating unit 40 is still located in the same build plane 20 compared to FIGS. 1a and 2.

Figure 4:
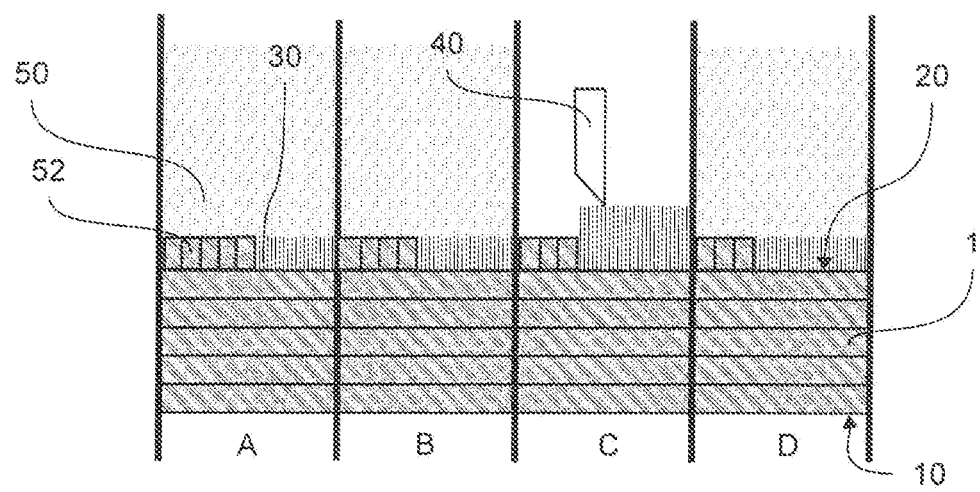

In FIG. 4, the further progress of the selective solidification in all four segments A; B; C; D can be seen from the respective progress indicators 52. Due to the position of the preferably continuously moving coating unit 40 in the third segment C, the selective solidification in the third segment C is temporarily deactivated or suspended.

Figure 5:
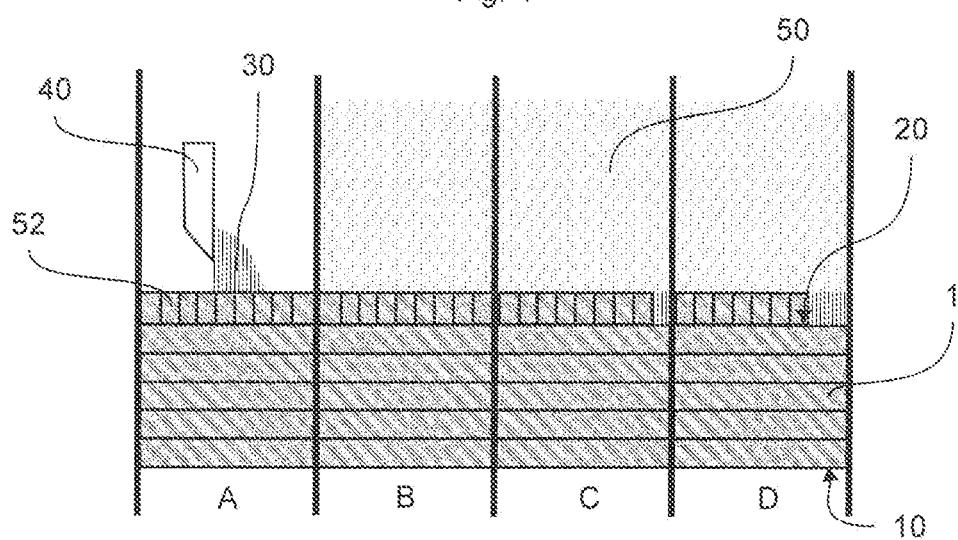

In FIG. 5, the first segment A has already been selectively solidified and the irradiation time as required has already expired, while the other segments B; C; D are still being irradiated, in particular until the irradiation time provided as required for each segment B; C; D has expired.

In FIG. 6, the build plane has already been readjusted by changing the vertical relative position between the coating unit 40 and the build platform 10, in particular by spacing them further apart in the vertical direction. According to FIG. 6, the application of a further layer of build-up material 30 has begun in the first and second segments A; B, even if the selective solidification of the previously deposited layer of build-up material 30 has not yet been completed in the remaining segments C; D (cf. also FIG. 5).

The first segment A thus represents a lowering segment. In particular, in the first segment A as a lowering segment according to FIG. 6, no complete layer of build-up material is applied over the entire extension of the first segment A. Rather, the first segment A is only partially covered with a layer of build-up material 30.

It can be seen from FIG. 6 that the first segment A is only partially covered with build-up material 30 in the readjusted build plane 20. The coating unit 40 enters into the second segment B for the application of a further layer of build-up material 30 in an, in particular, continuous movement and coordinated with the expiry of the irradiation time of the second segment B as required. By means of this timing of selective solidification and the application of a new layer of build-up material 30, the non-productive times of the manufacturing method or the production method for the at least one three-dimensional object 1 are reduced.

FIG. 7 shows that in the second and third segments B; C, in which a new, complete layer of build-up material 30 has been applied, selective solidification by the associated irradiation unit 50 has already begun. In contrast, no selective solidification is performed in the only partially coated first segment A as a lowering segment until the coating unit 40 has deposited a complete layer of build-up material 30 over the entire extension of the first segment A in the following circulation. After application of the build-up material 30 over the entire extension of the first segment A as a lowering segment, a complete layer of build-up material is present along the adjusted build plane 20.

Provided that selective solidification of the complete layer of build-up material in the subsequent segments B; C; D has not yet progressed to such an extent that a readjustment of the build plane and/or the deposition of a new layer of build-up material 30 can take place, the coating unit 40 subsequently switches into the idle run, i.e. the travel without applying a layer of build-up material 30.

In this sense, the lowering segment may move across each of the segments A; B; C; D or subsegments A1-D2, in the course of changing the relative position between the coating unit 40 and the build platform 10 to provide a readjusted build plane 20.

In FIG. 8, an examplary embodiment of a system according to the invention for additive manufacturing of at least one three-dimensional object 1 is shown in a perspective cross-section.

The system comprises the build platform 10, above which a build space is formed for the layer-by-layer construction of at least one three-dimensional object 1. In particular, one three-dimensional object 1 or a plurality of three-dimensional objects 1 distributed along the annular or circular extension of the build platform 10 can be built up layer by layer.

The coating unit 40 is arranged above and vertically spaced from the build platform 10 and can apply or deposit build-up material 30 along the respective set build plane 20 in the sense of a layered construction.

Irradiation units 50 are arranged above and vertically spaced from the coating unit 40 and distributed over the extension of the annular build platform 10. In particular, the irradiation units 50 are each assigned and arranged to the segments A; B; C; D for selective solidification.

In summary, the targeted use of the irradiation units 50 and the coating unit 40, which completes idle runs as required, enables time-optimised manufacture of at least one three-dimensional object 1. By means of the idle runs of the coating unit 40, in particular when the coating unit 40 is moving at maximum speed, an interruption of the selective solidification in the single segments A; B; C; D or in the single subsegments A1; A2; B1; B2; C1; C2; D1; D2 can be kept to a minimum during the passage of the coating unit 40 and a preferably continuously ongoing manufacturing process can be provided.

Along these lines, the parallel deposition of build-up material 30 and the selective solidification along sections or segments A-D and/or subsegments A1; A2; B1; B2; C1; C2; D1; D2 in the adjusted build plane 20 make it possible to reduce the non-productive times for additive manufacturing, to optimise the efficiency of the system utilisation in the production of three-dimensional objects 1, in particular also of a single large three-dimensional object 1, and to ensure a sufficient quality of the resulting three-dimensional object 1.

LIST OF REFERENCE SIGNS 1 object to be manufactured/processed layers of build-up material
10 build platform
20 build plane
30 layer of build-up material to be applied
40 coating unit
50 activated irradiation unit
52 progress indicators
A; B; C; D segments
A1; A2 subsegments of the first segment
B1; B2 subsegments of the second segment
C1; C2 subsegments of the third segment
D1; D2 subsegments of the fourth segment

The invention claimed is:

1. A method for additive manufacturing of three-dimensional objects by a system comprising a build space, a build platform within the build space, on which the at least one object to be manufactured can be built up layer by layer, at least one coating unit for dispensing the build-up material layer by layer in a build plane which is provided parallel to the build platform, and at least a first irradiation unit and a second irradiation unit for locally selective solidification of the build-up material in the build plane, the method comprising:
  subdividing the build space into at least a first and a second segment along an extension direction of the build platform, wherein at least one of the segments is formed as a single segment or is subdivided into at least two subsegments and each segment or the subsegments of one of the segments assigned to one of the irradiation units;
  moving the at least one coating unit in the build space along the segments at a constant speed;
  applying at least one layer of the build-up material by using the at least one coating unit;
  activating the assigned irradiation unit in the respective segment or subsegment after the at least one layer of build-up material in the respective segment or subsegment is applied, the applied layer of build-up material is not yet selectively solidified and the at least one coating unit has left the segment or subsegment; and
  deactivating the application of build-up material by the at least one coating unit after the application of at least one layer of the build-up material, wherein the at least one coating unit is moved on through any number of segments or subsegments so that the at least one coating unit performs at least one idle run, wherein an idle run comprises the deactivation of a discharge of build-up material from the coating unit, and wherein the coating unit is moved continuously and exclusively in one direction of travel during the idle run and before the idle run.

2. The method according to claim 1, wherein the respective irradiation unit is deactivated for a segment or a subsegment of a segment while the at least one coating unit passes through the respective segment or subsegment or after an irradiation time for selectively solidifying the deposited layer of build-up material in the respective segment or subsegment is reached.

3. The method according to claim 1, wherein a change in a relative position between the build platform and the at least one coating unit to provide a changed build plane occurs continuously or discontinuously.

4. The method according to claim 1, wherein the at least one coating unit starts depositing a further layer of build-up material in any selectively solidified segment or subsegment as a lowering segment when the at least one coating unit can accomplish a circulation for the application of a layer of build-up material without entering a not selectively solidified segment or subsegment.

5. The method according to claim 4, wherein the at least one coating unit deposits a complete layer of build-up material in the lowering segment subsequent to the remaining segments or subsegments.

6. The method according to claim 1, wherein activating the assigned irradiation unit occurs with:
- activating the associated irradiation unit in the respective segment for alternatively irradiating the associated first or second subsegment after the at least one coating unit has left the subsegment to be selectively solidified,
- wherein the at least one coating unit can pass through the first subsegment while the second subsegment is selectively solidified, or can pass through the second subsegment while the first subsegment is selectively solidified.

7. The method according to claim 1, wherein the idle run is carried out exclusively above the segments or subsegments.

\* \* \* \* \*